(12) United States Patent
Cheng et al.

(10) Patent No.: US 11,035,619 B2
(45) Date of Patent: Jun. 15, 2021

(54) DRAINAGE FOR TEMPERATURE AND HUMIDITY CONTROLLING SYSTEM

(71) Applicant: TAIWAN SEMICONDUCTOR MANUFACTURING CO., LTD., Hsinchu (TW)

(72) Inventors: Wei-Chang Cheng, Taichung (TW); Chi-Hung Liao, Taipei (TW); Chien-Hung Wang, Miaoli County (TW); Guan-Yu Lin, Taichung (TW); Yung-Yao Lee, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 239 days.

(21) Appl. No.: 15/472,428

(22) Filed: Mar. 29, 2017

(65) Prior Publication Data
US 2018/0164839 A1    Jun. 14, 2018

Related U.S. Application Data

(60) Provisional application No. 62/431,918, filed on Dec. 9, 2016.

(51) Int. Cl.
| | | |
|---|---|---|
| *F28D 15/00* | (2006.01) |
| *F28D 15/02* | (2006.01) |
| *G05D 23/00* | (2006.01) |
| *F25D 21/14* | (2006.01) |

(52) U.S. Cl.
CPC ....... *F28D 15/0266* (2013.01); *F28D 15/025* (2013.01); *F25D 21/14* (2013.01); *G05D 23/00* (2013.01); *Y02B 30/70* (2013.01)

(58) Field of Classification Search
CPC . F28D 14/0266; F28D 15/025; F28D 15/0258
USPC .......................... 165/104.27, 104.32, 104.34
See application file for complete search history.

(56) References Cited

U.S. PATENT DOCUMENTS

| | | | | |
|---|---|---|---|---|
| 3,951,204 A * | 4/1976 | Movick | ................. | F28D 15/025 |
| | | | | 165/104.19 |
| 4,426,959 A * | 1/1984 | McCurley | ................. | F16L 5/14 |
| | | | | 122/33 |
| 4,745,965 A * | 5/1988 | Katsura | ................. | F28D 15/025 |
| | | | | 122/366 |
| 9,874,406 B2 * | 1/2018 | Fuchs | .................... | F25B 23/006 |
| 10,113,808 B2 * | 10/2018 | Yang | ...................... | F28D 15/00 |
| 2002/0086259 A1 * | 7/2002 | Shirakawa | .............. | F28D 15/02 |
| | | | | 432/152 |

(Continued)

FOREIGN PATENT DOCUMENTS

WO    WO-2017038003 A1 *  3/2017  ............. F28D 15/02

*Primary Examiner* — Edward F Landrum
*Assistant Examiner* — Alexis K Cox
(74) *Attorney, Agent, or Firm* — McClure, Qualey & Rodack, LLP

(57) ABSTRACT

A drainage device includes a tank, a pipe and an air duct. The tank has a base plate and at least one first wall. The first wall is disposed on the base plate. The base plate and the first wall define a space. The pipe defines a channel. The pipe connects with the base plate. The channel communicates with the space. The air duct is disposed partially in the space and partially in the channel. There exists at least one gap between an outer surface of the air duct and an inner surface of the pipe.

20 Claims, 3 Drawing Sheets

(56) References Cited

U.S. PATENT DOCUMENTS

| | | | | |
|---|---|---|---|---|
| 2004/0080907 A1* | 4/2004 | Belady | .............. | H05K 7/20727 |
| | | | | 361/679.47 |
| 2006/0216665 A1* | 9/2006 | Fukuoka | .............. | F27D 3/0084 |
| | | | | 432/4 |
| 2006/0234178 A1* | 10/2006 | Hayashi | ................ | F27D 3/0084 |
| | | | | 432/198 |
| 2018/0248464 A1* | 8/2018 | Murase | ................... | F28D 15/02 |

\* cited by examiner

DRAINAGE FOR TEMPERATURE AND HUMIDITY CONTROLLING SYSTEM

CROSS REFERENCE

This application claims priority to Provisional Application Ser. No. 62/431,918, filed Dec. 9, 2016, which is herein incorporated by reference.

BACKGROUND

With the rapid development and demand for the electronic devices nowadays, in the semiconductor manufacturing industry, the performance of different machines involved for each single step of the manufacturing process affects the quality of the products. For example, control of the temperature and humidity during operation is one parameter that affects the performance of the machines and thus the quality of the products.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
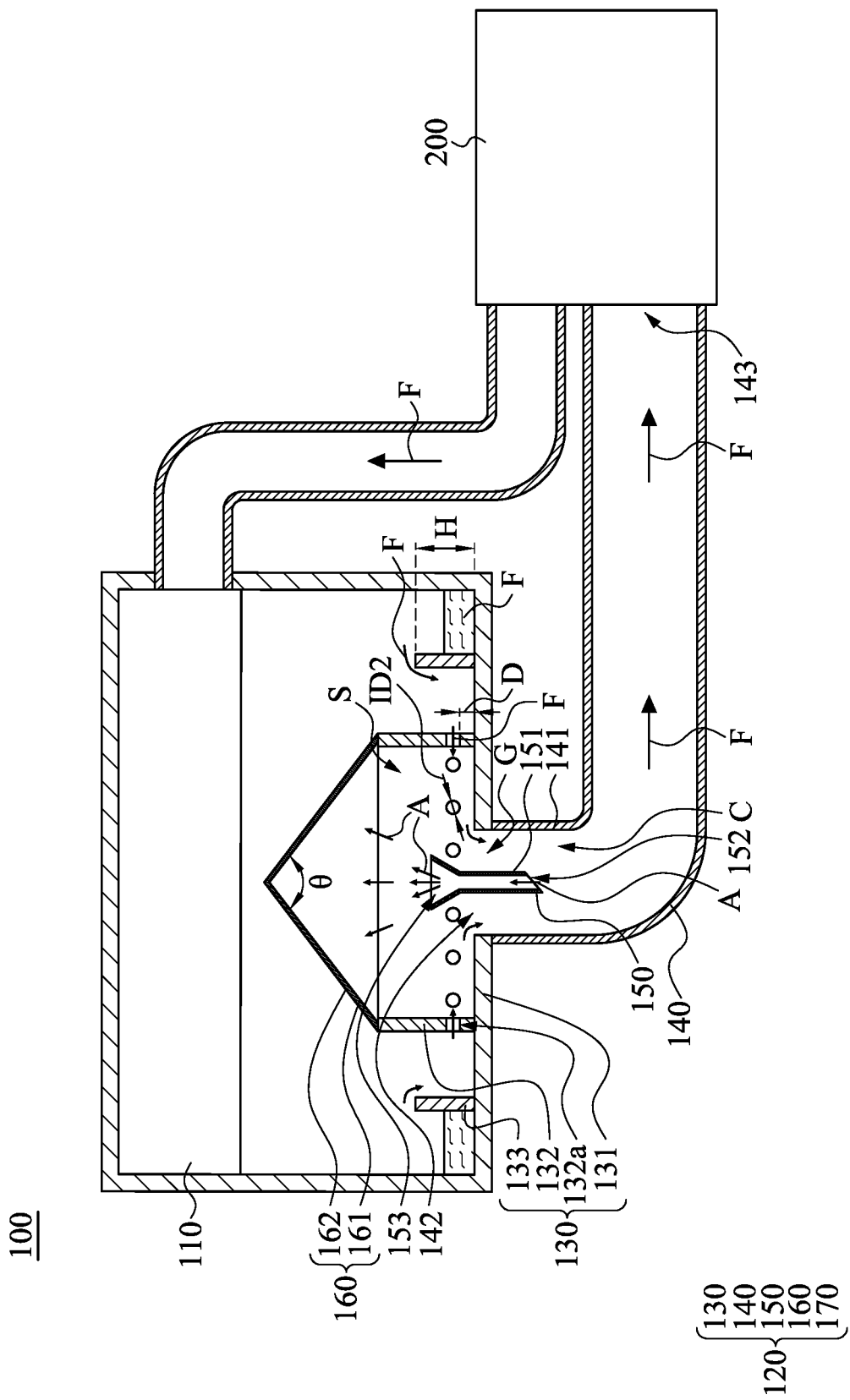
FIG. 1 is a schematic view of a temperature and humidity controlling system in accordance with some other embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Please refer to FIG. 1. FIG. 1 is a schematic view of a temperature and humidity controlling system 100 in accordance with some other embodiments of the present disclosure. As shown in FIG. 1, a temperature and humidity controlling system 100 is provided. In some embodiments, the temperature and humidity controlling system 100 includes a condenser 110, tank 130, a pipe 140 and an air duct 150. The condenser 110 is configured for cooling down a cooling fluid F flowing out from a heat producing equipment 200, such as a hot plate (not shown). In some embodiments, the cooling fluid F can be water. However, this does not intend to limit the present disclosure. The tank 130 defines a space S. The space S is configured for collecting the cooled cooling fluid F from the condenser 110. The condenser 110 is disposed over the tank 130. The pipe 140 defines a channel C and has an inlet 142 and an outlet 143 opposite to each other. The inlet 142 of the pipe 140 is connected with a base plate 131 of the tank 130 away from the condenser 110. The channel C and thus the inlet 142 is communicated with the space S of the tank 130. Therefore, the cooled cooling fluid F is able to flow from the space S of the tank 130 to the channel C of the pipe 140. Meanwhile, the outlet 143 of the pipe 140 is connected with the heat producing equipment 200. Thus, the cooled cooling fluid F is able to flow from the channel C of the pipe 140 to the heat producing equipment 200. The air duct 150 is disposed partially in the space S of the tank 130 and partially in the channel C of the pipe 140. In other words, the air duct 150 has an inlet 152 and an outlet 153 opposite to each other. The outlet 153 of the air duct 150 is located in the space S of the tank 130, while the inlet 152 of the air duct 150 is located in the channel C of the pipe 140. Furthermore, there exists at least one gap G between an outer surface 151 of the air duct 150 and an inner surface 141 of the pipe 140. In some embodiments, the cooled cooling fluid F is able to flow from the space S into the gap G between the outer surface 151 of the air duct 150 and the inner surface 141 of the pipe 140.

Moreover, as shown in FIG. 1, the outlet 153 of the air duct 150 is in a position higher than the inlet 142 of the pipe 140. In other words, the outlet 153 of the air duct 150 is away from the channel C. In this way, when the cooled cooling fluid F flows from the space S into the gap G, the chance that the cooled cooling fluid F gets into the air duct 150 through the outlet 153 is reduced.

In some embodiments, during the operation of the heat producing equipment 200, the cooling fluid F with heat from the heat producing equipment 200 is guided to flow to the condenser 110 of the temperature and humidity controlling system 100. Afterwards, the cooling fluid F is cooled down by the condenser 110 of the temperature and humidity controlling system 100, and then the cooled cooling fluid F is delivered back to the heat producing equipment 200. To facilitate this circulation of the cooling fluid F, a pump (not shown) may be employed. With this circulation of the cooling fluid F between the temperature and humidity controlling system 100 and the heat producing equipment 200, the heat generated by the heat producing equipment 200 is transferred to and absorbed by the condenser 110 of the temperature and humidity controlling system 100. Thus, the temperature of the heat producing equipment 200 can be correspondingly decreased. As a result, the temperature and the humidity of the heat producing equipment 200 can be controlled. In some situations, the heat producing equipment 200 can be any equipment or machine which generates heat during operation. For example, the heat producing equipment 200 can be manufacturing equipment utilized in the semiconductor manufacturing industry.

To be more specific, as shown in FIG. 1, the temperature and humidity controlling system 100 includes a drainage device 120. The drainage device 120 includes the tank 130, the pipe 140 and the air duct 150. The tank 130 has the base plate 131 and at least one first wall 132. The base plate 131 is located at a bottom part of the tank 130. The first wall 132 is disposed on the base plate 131. In some embodiments, the first wall 132 is an annular structure over the base plate 131. The annular shape of the first wall 132 can be of a square, a rectangle, a circle or any other polygonal shapes. However, these examples of the annular shape of the first wall 132 do not intend to limit the present disclosure. To be more accurate, the base plate 131 and the first wall 132 in the form of the annular structure together define the space S of the tank 130. As mentioned above, the space S is configured for collecting the cooled cooling fluid F as cooled down by the condenser 110.

When the cooled cooling fluid F as cooled down by the condenser 110 is collected in the space S, the cooled cooling fluid F is collected over the base plate 131 of the tank 130. Afterwards, since the space S is communicated with the channel C as mentioned above, the cooled cooling fluid F on the base plate 131 of the tank 130 is guided to flow downwards to the channel C of the pipe 140 under the action of gravity. Moreover, since the outlet 143 of the pipe 140 is connected with the heat producing equipment 200, the cooled cooling fluid F is able to flow back to the heat producing equipment 200 through the channel C of the pipe 140. In addition, as mentioned above, there exists at least one gap G between the outer surface 151 of the air duct 150 and the inner surface 141 of the pipe 140. Therefore, to be more specific, the cooled cooling fluid F flows into the gap G between the outer surface 151 of the air duct 150 and the inner surface 141 of the pipe 140. In some embodiments, as shown in FIG. 1, the air duct 150 is received in the pipe 140, and the air duct 150 is spaced apart from the pipe 140. Thus, the gap G exists in the room around the air duct 150.

As mentioned above, the outlet 153 of the air duct 150 is located in the space S of the tank 130, while the inlet 152 of the air duct 150 is located in the channel C of the pipe 140. As a result, when the cooled cooling fluid F flows into the gap G between the outer surface 151 of the air duct 150 and the inner surface 141 of the pipe 140, any gas A possible to appear in the pipe 140 is able to flow upwards through the air duct 150 from the inlet 152 of the air duct 150 in the channel C of the pipe 140 to the outlet 153 of the air duct 150 in the space S of the tank 130. In other words, the flow of the gas A through the air duct 150 out of the pipe 140 and the flow of the cooled cooling fluid F from the space S into the channel C of the pipe 140 are able to occur at the same period of time. This means the exchange of the gas A out of the pipe 140 and the cooled cooling fluid F into the pipe 140 is able to occur at the same period of time. Therefore, the chance for the existence of a gas section (also called as an airlock) in the channel C of the pipe 140 is avoided. As a result, even if a pool of cooled cooling fluid F is collected and accumulated over the base plate 131 of the tank 130 and also over the channel C of the pipe 140, the existence of a gas session in the channel C of the pipe 140 can be prevented. Thus, the chance that the flow of the cooled cooling fluid F from the space S to the heat producing equipment 200 through the channel C of the pipe 140 to be blocked by a gas session in the channel C of the pipe 140 is eliminated. Hence, the flow of the cooled cooling fluid F from the temperature and humidity controlling system 100 to the heat producing equipment 200 during the operation of the heat producing equipment 200 through the channel C of the pipe 140 can be maintained smooth. As a result, the temperature and the humidity of the heat producing equipment 200 can be effectively controlled by the temperature and humidity controlling system 100. Consequently, the performance of the operation of the heat producing equipment 200 can also be maintained.

In addition, as shown in FIG. 1, the drainage device 120 further includes a cover 160. In some embodiments, the cover 160 is disposed at a side of the tank 130 away from the pipe 140. In other words, the cover 160 is disposed over the tank 130. Furthermore, the cover 160 is at least partially located between the condenser 110 and the pipe 140. To be more specific, the outlet 153 of the air duct 150 in the space S is located within a projection of the cover 160 towards the base plate 131 of the tank 130. This means the outlet 153 of the air duct 150 in the space S is blocked by the cover 160 as viewed from the condenser 110. In this way, when the cooled cooling fluid F is formed from the condenser 110 and the cooled cooling fluid F falls into the space S under the action of gravity, the chance that the cooled cooling fluid F gets into the air duct 150 through the outlet 153 of the air duct 150 in the space S is eliminated. In this way, the chance that the air duct 150 to be blocked by the cooled cooling fluid F is correspondingly eliminated. Thus, any gas A possible to appear in the pipe 140 is able to flow through the air duct 150 smoothly from the inlet 152 of the air duct 150 in the channel C of the pipe 140 to the outlet 153 of the air duct 150 in the space S of the tank 130.

Furthermore, in some embodiments, the cover 160 has at least two sloping structures 161. The sloping structures 161 are connected with each other. Each of the sloping structures 161 has a sliding surface 162 at least partially facing to the condenser 110. In addition, an included angle θ facing to the pipe 140 is formed between the two sloping structures 161 of the cover 160. For instance, the included angle θ is less than about 180 degrees. This means that the sloping structures 161 and thus the sliding surface 162 of each of the sloping structures 161 are inclined relative to the base plate 131 of the tank 130. As a result, when the cooled cooling fluid F from the condenser 110 falls on the sliding surfaces 162 of the sloping structures 161, the cooled cooling fluid F will slide on the sliding surfaces 162 of the sloping structures 161 under the action of gravity. Thus, the flow of the cooled cooling fluid F is guided to the space S of the tank 130 by the sloping structures 161 of the cover 160.

In some embodiments, the cover 160 is at least partially made of a water-proof material. To be more specific, the sloping structures 161 of the cover 160 are made of a water-proof material, for instance a water-proof membrane, such that the sliding surfaces 162 of the sloping structures 161 are water-proof. As a result, when the cooled cooling fluid F from the condenser 110 falls on the sliding surfaces 162 of the sloping structures 161, the cooled cooling fluid F will not be absorbed by the sliding surfaces 162 of the sloping structures 161. Instead, since the sliding surfaces 162 of the sloping structures 161 are water-proof, the cooled cooling fluid F falling on the sliding surfaces 162 of the sloping structures 161 will be guided to slide readily along the sliding surfaces 162 of the sloping structures 161.

Figure 2:
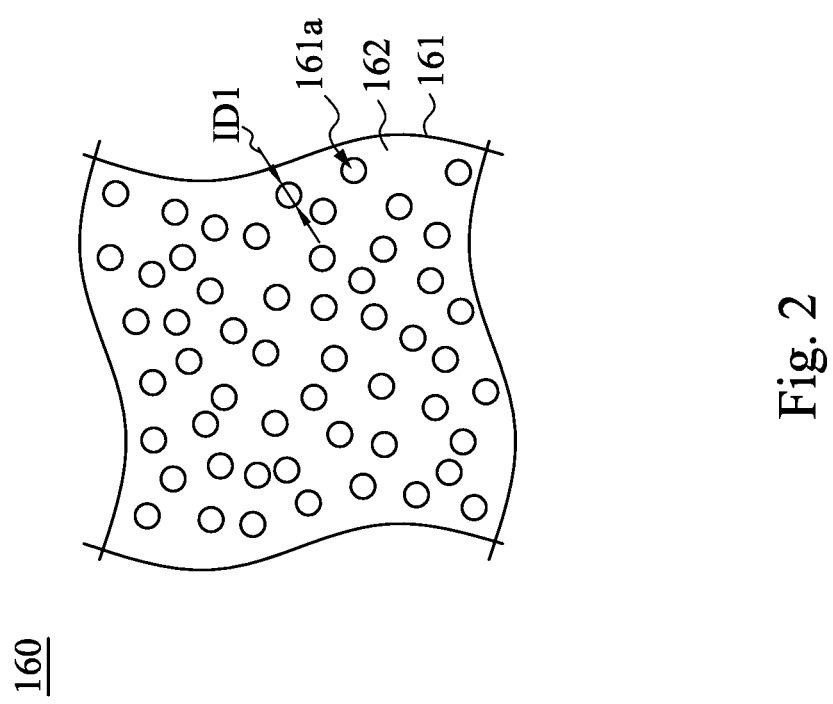
FIG. 2 is an enlarged view of the sliding surface of the cover of FIG. 1.

Please refer to FIG. 2. FIG. 2 is an enlarged view of the sliding surface 162 of the cover 160 of FIG. 1. In addition, in some embodiments, the cover 160 has a plurality of through holes 161a. The through holes 161a are located on the sliding surfaces 162 of the sloping structures 161. For instance, the sloping structures 161 of the cover 160 are made of a porous material. In some embodiments, each of the through holes 161a has a diameter ID1 less than about 10 microns. However, this size of the diameter ID1 of the through holes 161a does not intend to limit the present disclosure.

As mentioned above, the cooling fluid F can be water. Thus, for example, when the diameter ID1 of each of the through holes 161a is less than about 10 microns, the cooled cooling fluid F in the form of water droplets will be too big to pass through the through holes 161a located on the sliding surfaces 162 of the sloping structures 161. Thus, the cooled cooling fluid F in the form of water droplets is not able to penetrate through the sloping structures 161 of the cover 160 from the sliding surfaces 162. In this way, the chance that the cooled cooling fluid F gets into the air duct 150 through the end of the air duct 150 in the space S is eliminated.

On the other hand, when there is gas A coming out from the outlet 153 of the air duct 150 in the space S of the tank 130 as mentioned above, since there are through holes 161a located on the sliding surfaces 162 of the sloping structures 161, the gas A is able to go up to the cover 160 and pass through the cover 160 through the through holes 161a located on the sliding surfaces 162 of the sloping structures 161.

Please go back to FIG. 1. On the other hand, the first wall 132 of the tank 130 has a plurality of through holes 132a. As shown in FIG. 1, the through holes 132a are distributed near to an end of the first wall 132 near to the base plate 131. In other words, the through holes 132a of the first wall 132 are close to the base plate 131. As mentioned above, the first wall 132 surrounds to form an annular structure. In some embodiments, the cooled cooling fluid F flows from the outside of the annular structure to the inside of the annular structure, i.e., the space S, through the through holes 132a of the first wall 132. By the through holes 132a of the first wall 132, the speed that the cooled cooling fluid F flows from the outside of the annular structure to the space S is limited. As a result, the speed of flow of the cooled cooling fluid F is slower inside the first wall 132 as the annular structure, i.e., the space S, than outside the first wall 132. In this way, the volume of the cooled cooling fluid F flowing into the channel C of the pipe 140 from the space S is also limited. Therefore, the volume of the cooled cooling fluid F will not become too much in the channel C of the pipe 140 that the inlet 152 of the air duct 150 in the channel C of the pipe 140 is submerged into the cooled cooling fluid F. In other words, the inlet 152 of the air duct 150 in the channel C of the pipe 140 can be maintained to expose in the air. Thus, any gas A possible to appear in the pipe 140 is able to flow through the air duct 150 smoothly from the inlet 152 of the air duct 150 in the channel C of the pipe 140 to the outlet 153 of the air duct 150 in the space S of the tank 130.

In some embodiments, each of the through holes 132a of the first wall 132 has a diameter ID2. For example, the diameter ID2 of each of the through holes 132a of the first wall 132 ranges from about 1 mm to about 6 mm. However, this size range of the diameter ID2 of each of the through holes 132a of the first wall 132 does not intend to limit the present disclosure.

In addition, as shown in FIG. 1, the tank 130 further includes a second wall 133. The second wall 133 is disposed on the base plate 131. In some embodiments, the second wall 133 surrounds to form an annular structure. The annular shape of the second wall 133 can be of a square, a rectangle, a circle or any other polygonal shapes. However, these examples of the annular shape of the second wall 133 do not intend to limit the present disclosure. Furthermore, the first wall 132 is located between the space S and the second wall 133, and the second wall 133 is separated from the first wall 132.

With the presence of the second wall 133, the cooled cooling fluid F appears on the side of the second wall 133 away from the first wall 132 is blocked from flowing to the first wall 132. As a result, the volume of the cooled cooling fluid F flowing to the space S through the first wall 132 is controlled. Consequently, the volume of the cooled cooling fluid F flowing into the channel C of the pipe 140 from the space S is also limited. Therefore, the volume of the cooled cooling fluid F will not become too much in the channel C of the pipe 140 that the inlet 152 of the air duct 150 in the channel C of the pipe 140 is submerged into the cooled cooling fluid F. In other words, the inlet 152 of the air duct 150 in the channel C of the pipe 140 can be maintained to expose in the air. Thus, any gas A possible to appear in the pipe 140 is able to flow through the air duct 150 smoothly from the inlet 152 of the air duct 150 in the channel C of the pipe 140 to the outlet 153 of the air duct 150 in the space S of the tank 130.

To be more specific, each of the through holes 132a of the first wall 132 has a distance D measured from the base plate 131. Meanwhile, the second wall 133 has a height H measured from the base plate 131. In some embodiments, the cooled cooling fluid F is able to flow from the side of the second wall 133 away from the first wall 132 to the first wall 132 when the level of the cooled cooling fluid F collected and accumulated at the side of the second wall 133 away from the first wall 132 is higher than the height H. In some embodiments, the height H is larger than the distance D.

In addition, as shown in FIG. 1, the outlet 153 of the air duct 150 in the space S is in a shape of a funnel. When there is gas A coming out from the outlet 153 of the air duct 150 in the space S of the tank 130 as mentioned above, the gas A is spread out through the outlet 153 in the shape of a funnel, and the gas A being spread is able to penetrate through the through holes 161a (as shown in FIG. 2) of the cover 160 more efficiently and more readily.

Figure 3:
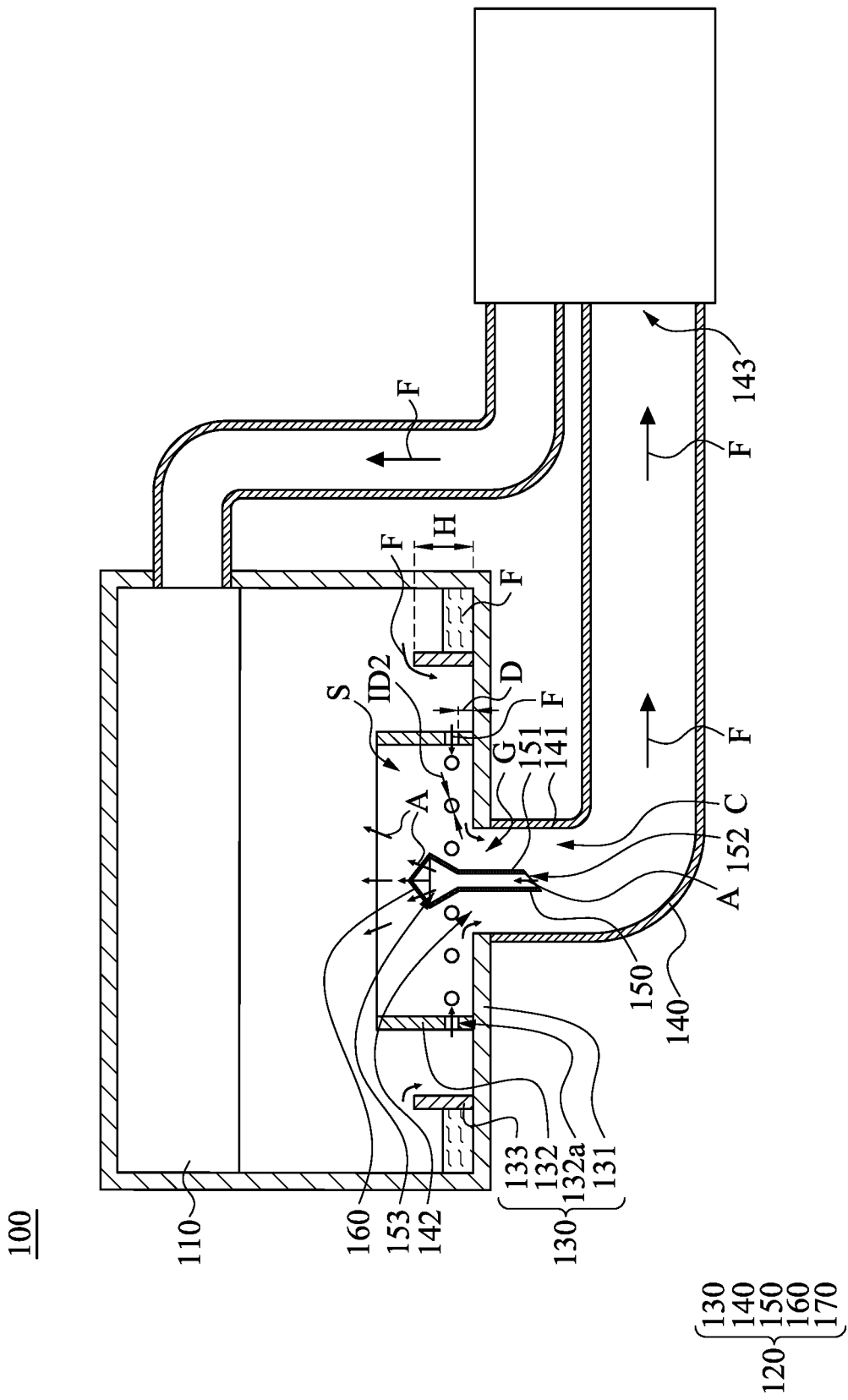
FIG. 3 is a schematic view of a temperature and humidity controlling system in accordance with some other embodiments of the present disclosure.

Please refer to FIG. 3. FIG. 3 is a schematic view of a temperature and humidity controlling system 100 in accordance with some other embodiments of the present disclosure. In some embodiments, as shown in FIG. 3, the cover 160 is disposed at the outlet 153 of the air duct 150 in the space S, in which the outlet 153 is in the shape of a funnel. Thus, the arrangement of the cover 160 becomes more flexible.

According to various embodiments of the present disclosure, since the outlet of the air duct is located in the space of the tank, while the inlet of the air duct is located in the channel of the pipe. As a result, when the cooled cooling fluid flows into the gap between the outer surface of the air duct and the inner surface of the pipe, any gas possible to appear in the pipe is able to flow through the air duct from the inlet of the air duct in the channel of the pipe to the outlet of the air duct in the space of the tank. In other words, the flow of the gas through the air duct out of the pipe and the flow of the cooled cooling fluid from the space into the channel of the pipe are able to occur at the same period of time. This means the exchange of the gas out of the pipe and the cooled cooling fluid into the pipe is able to occur at the same period of time. Therefore, the chance for the existence of a gas section (i.e., an airlock) in the channel of the pipe is avoided. As a result, even if a pool of cooled cooling fluid is collected and accumulated over the base plate of the tank and also over the channel of the pipe, the existence of a gas session in the channel of the pipe can be prevented. Thus, the chance that the flow of the cooled cooling fluid from the space to the heat producing equipment through the channel of the pipe to be blocked by a gas session in the channel of the pipe is eliminated. Hence, the flow of the cooled cooling fluid from the temperature and humidity controlling system to the heat producing equipment during the operation of the heat producing equipment through the channel of the pipe can be maintained smooth. As a result, the temperature and thus the humidity of the heat producing equipment can be effectively controlled by the temperature and humidity controlling system. Consequently, the performance of the operation of the heat producing equipment can also be maintained.

According to various embodiments of the present disclosure, the drainage device includes the tank, the pipe and the air duct. The tank has the base plate and at least one first wall. The first wall is disposed on the base plate. The base plate and the first wall define the space. The pipe defines the channel. The pipe connects with the base plate. The channel communicates with the space.

According to various embodiments of the present disclosure, the temperature and humidity controlling system includes the tank, the condenser, the pipe and the air duct. The tank defines the space. The condenser is over the tank. The pipe has the inlet communicating with the space of the tank. The air duct has an inlet in the pipe. The air duct is spaced apart from the pipe. The air duct has an outlet in the space of the tank.

According to various embodiments of the present disclosure, the method for draining the cooling fluid is provided. The method includes guiding the cooling fluid with heat to flow from the heat producing equipment to the condenser, cooling down the cooling fluid with heat by the condenser to become the cooled cooling fluid, guiding the cooled cooling fluid to flow downwards between the inner surface of the pipe and the outer surface of the air duct partially located in the pipe, and guiding the gas to flow upwards through the air duct.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A temperature humidity controlling system, comprising:
a tank defining a space;
a condenser over the tank;
a pipe having an inlet communicating with the space of the tank; and
a duct having an inlet in a position located in the pipe and having an outlet in a position located in the space of the tank, wherein the duct is spaced apart from the pipe, the inlet and the outlet of the duct face towards opposite directions, and the inlet of the duct is vertically above a turning corner of the pipe, wherein the tank comprises a bottom and a wall structure extending upwardly from the bottom of the tank, the bottom and the wall structure define the space of the tank, the wall structure laterally surrounds a portion of the duct and has a plurality of through holes therein, and a position of each of the plurality of through holes is lower than the outlet of the duct.

2. The system of claim 1, wherein the outlet of the duct is in a position higher than the inlet of the pipe.

3. The system of claim 1, further comprising:
a cover disposed at least partially between the condenser and the pipe, wherein an entirety of the outlet of the duct is overlapped with the cover.

4. The system of claim 1, further comprising:
a hot plate fluidly coupled to the condenser, wherein the condenser is configured to cool a fluid flowing out from the hot plate.

5. The system of claim 4, wherein an outlet of the pipe is connected with the hot plate.

6. The system of claim 4, wherein the pipe is connected with the hot plate and is configured to deliver the fluid cooled by the condenser to the hot plate.

7. The system of claim 1, further comprising:
a cover covering the outlet of the duct, wherein the cover includes a sloping structure that has an inclined sliding surface.

8. The system of claim 1, further comprising a supply pipe, wherein the system is configured to control a temperature and humidity of a heat producing equipment, the pipe has an outlet directly connected with the heat producing equipment, and the supply pipe has an inlet directly connected with the heat producing equipment to receive a cooling fluid from the heat producing equipment and an outlet that is at a sidewall of the tank to communicate with the condenser and to supply the cooling fluid to the condenser.

9. A system, comprising:
a condenser configured to cool a fluid;
a tank defining a space and configured to receive, into the space, the fluid cooled by the condenser;
a pipe having an inlet communicating with the space of the tank, wherein the pipe is configured to drain the fluid in the space therethrough; and
a duct having an inlet within the pipe and spaced apart from an inner sidewall of the pipe and an outlet above the inlet and in the space of the tank, wherein the inlet of the duct vertically overlaps a turning corner of the pipe, wherein the tank comprises a bottom and a wall structure extending upwardly from the bottom of the tank, the bottom and the wall structure define the space of the tank, the wall structure laterally surrounds a portion of the duct and has a plurality of through holes each laterally extending from an inner sidewall of the wall structure to an outer sidewall of the wall structure, and a position of the each of the plurality of through holes is lower than the outlet of the duct.

10. The system of claim 9, further comprising:
a cover covering the outlet of the duct, wherein the cover comprises a first sloping structure that has an inclined sliding surface.

11. The system of claim 10, wherein the cover forms an inverted V-shape when viewed in a cross section.

12. The system of claim 9, further comprising:
a hot plate fluidly coupled to the condenser, wherein the condenser is configured to cool the fluid flowing out from the hot plate.

13. The system of claim 12, wherein an outlet of the pipe is connected with the hot plate, and the pipe is configured to deliver the fluid cooled by the condenser to the hot plate.

14. The system of claim 9, wherein the outlet of the duct in the space of the tank is in a shape of a funnel.

15. A system, comprising:
a condenser configured to cool a fluid;
a tank defining a space and configured to receive, into the space, the fluid cooled by the condenser;
a pipe coupled to the tank and having an inlet communicating with the space of the tank, wherein the pipe is configured to drain the fluid in the space therethrough;
a duct having an inlet within the pipe and spaced apart from an inner sidewall of the pipe and an outlet in the space of the tank, wherein the inlet and the outlet of the duct face towards opposite directions;
a wall structure extending upwardly from a bottom of the tank, laterally surrounding a portion of the duct, and having a through hole therein, wherein a lowermost position of the through hole is lower than the outlet of the duct; and
a cover disposed at a side of the tank away from the pipe, wherein the outlet of the duct in the space of the tank is located within a projection of the cover towards a base plate of the tank, and the cover includes at least two sloping structures, and an angle facing the pipe is included by the at least two sloping structures.

16. The system of claim 15, further comprising:
a cover disposed at least partially between the condenser and the pipe,
wherein the outlet of the duct in the space of the tank is located within a projection of the cover towards the tank.

17. The system of claim 15, further comprising:
a hot plate fluidly coupled to the condenser, wherein the condenser is configured to cool a fluid flowing out from the hot plate.

18. The system of claim 17, wherein an outlet of the pipe is connected with the hot plate.

19. The system of claim 17, wherein the pipe is connected with the hot plate and is configured to deliver the fluid cooled by the condenser back to the hot plate.

20. The system of claim 15, wherein the outlet of the duct in the space of the tank is in a shape of a funnel.

* * * * *